United States Patent [19]
Larkin et al.

[11] 3,876,567

[45] Apr. 8, 1975

[54] METHOD FOR PREPARING LOW DENSITY POLYURETHANE FOAMS IN THE PRESENCE OF METHYLENE CHLORIDE

[75] Inventors: William A. Larkin, Morristown; Robert C. Ringwood, Jr., Sewaren; Kenneth Treadwell, Rahway, all of N.J.

[73] Assignee: M&T Chemicals Inc., Greenwich, Conn.

[22] Filed: June 15, 1973

[21] Appl. No.: 370,411

[52] U.S. Cl.... 260/2.5 AF; 260/2.5 AB; 260/2.5 AC; 260/2.5 AZ
[51] Int. Cl............................................. C08g 22/44
[58] Field of Search ... 260/2.5 AB, 2.5 AC, 2.5 AF, 260/2.5 AZ

[56]  References Cited
UNITED STATES PATENTS
3,305,497   2/1967   Stallings et al...................... 260/2.5
3,620,985   11/1971  Larkin et al........................ 260/2.5
3,664,976   5/1972   Evans et al. ....................... 260/2.5

OTHER PUBLICATIONS

Journal of Cellular Plastics, June, 1968, p. 216–220, Boucher et al.

*Primary Examiner*—Eugene C. Rzucidlo
*Attorney, Agent, or Firm*—Robert P. Auber; Kenneth G. Wheeless; Robert Spector

[57]  ABSTRACT

This invention relates to a process for preparing low density polyurethane foams using relatively large amounts of methylene chloride as the foaming agent in the presence of a stannous carboxylate as the gel catalyst and a foaming catalyst comprising an antimony compound, a base, and a nitrogen-containing organic compound.

6 Claims, No Drawings

METHOD FOR PREPARING LOW DENSITY POLYURETHANE FOAMS IN THE PRESENCE OF METHYLENE CHLORIDE

This invention relates to low density polyurethane foams and more specifically to a foaming agent and catalyst system for producing these foams.

It is well known that polyurethanes can be prepared by reacting organic polyfunctional isocyanates with organic polyols having two or more reactive hydrogen atoms as determined by the Zerewitinoff method. When this reaction is conducted under anhydrous conditions and in the absence of a gas-forming reagent the resulting polyurethane is often nonporous. If a cellular or foamed product is desired, a foaming agent, which may comprise water and an excess of isocyanate must be added to the mixture. The reaction of water with the isocyanate compound produces carbon dioxide which is entrapped in the reaction mixture and forms a cellular structure with a density of between 1.5 and 2 pounds per cubic foot (24 to 32 kg. per cubic meter), depending upon the amounts of excess isocyanate and water employed. Foams exhibiting densities between 0.7 and 1 pound per cubic foot (11–16 kg. per cubic meter) are often termed "super soft" and are desirable for a number of end uses, including packing material for preventing damage to delicate articles during shipping and as filling for upholstery pillows. While it may be possible to achieve these lower density foams using the carbon dioxide generated by the reaction of water with a large excess of isocyanate, this approach usually is not considered commercially practical due to the relatively high cost of isocyanates. A more conventional procedure for preparing low density urethane foams is to employ an auxiliary foaming agent which is usually a fluorine-containing hydrocarbon, such as trichlorofluoromethane, either alone or in combination with methylene chloride. These compounds boil or exhibit a significant vapor pressure at ambient temperatures and are volatilized during the exothermic reaction of the isocyanate with an active hydrogen-containing polyol. The expanding gases are entrapped within the reaction mixture and form a cellular structure in the same manner as the carbon dioxide formed during the isocyanate-water reaction. A disadvantage of using fluorine-containing hydrocarbons as an auxiliary foaming agent is the relatively high cost of these compounds and it would therefore be economically attractive to entirely replace these compounds with the less expensive methylene chloride. Up until now it has not been possible to obtain foams of uniform cellular structure using amines, which are conventional foaming catalysts, and a concentration of methylene chloride in excess of 10% by weight of the active hydrogen compound employed to prepare the polyurethane. The resultant foam contains discontinuities and large voids which make it unsuitable for the intended end use.

It is therefore an object of this invention to provide a catalyst system which can be employed in combination with relatively large concentrations of methylene chloride as the foaming agent to prepare low density urethane foams that exhibit a uniform cell structure.

SUMMARY OF THE INVENTION

The present invention concerns a method for preparing low density cellular polyurethane comprising reacting a polyalkylene polyol having reactive hydrogens as determined by the Zerewitinoff method, an organic polyfunctional isocyanate and, optionally, water in the presence of a. between 0.5 and 40%, based on the weight of said polyol, of a foaming agent containing between 30 and 100%, based on the weight of said foaming agent, of methylene chloride, b. between 0.005 and 4.2%, based on the weight of polyol, of a gel catalyst selected from stannous salts of carboxylic acids of the formula $Sn(OCOR)_2$, wherein the acid contains between 1 and 20 carbon atoms, and organotin compounds of the general formula $R_2'SnX_2$ wherein $R'$ is selected from alkyl and alkenyl radicals, each of which contain between 1 and 18 carbon atoms, cycloalkyl, aryl, alkaryl and aralkyl hydrocarbon radicals, and the foregoing radicals when inertly substituted, and X represents a monovalent radical selected from the group consisting of halogen atoms and radicals of the general formula $R''COO—$, $R''S—$, $R''O—$ and $—SR'''COOR''$ wherein $R''$ is in turn selected from the same group as $R'$ and $R'''$ is an alkylene radical containing between 1 and 8 carbon atoms, and c. a foaming catalyst consisting of a mixture of an antimony compound, a base and a nitrogen-containing organic compound as set forth in the following specification.

DETAILED DESCRIPTION OF THE INVENTION

The foaming agent and catalysts of this invention provide a rapid yet easily controlled foaming reaction without the excessive heat generation that could cause scorching or charring of the cellular product. In addition, raw material costs are substantially reduced due to the substitution of methylene chloride for large amounts of the more expensive fluorinated hydrocarbons.

The concentration of foaming agent in the reaction mixture employed to prepare the present cellular polyurethanes is between 0.5 and 40%, based on the weight of the polyol reagent. Methylene chloride constitutes between 30.0 and 100% of the total foaming agent, with any remainder consisting of water and an excess of isocyanate, over and above the amount required to react with the polyol. Preferably the total of excess isocyanate and water does not constitute more than 30.0% by weight of the total foaming agent or 3.0% based on the weight of polyol.

To obtain optimum results the foaming or rise reaction should occur simultaneously with the gelling (or solidification) reaction. When the gelling time of the reaction mixture is properly balanced with the rise time, the solidifying mass entraps the vaporized foaming agent thereby resulting in a uniform cellular product.

THE FOAMING CATALYST a. The Base Component

The base component of the novel catalyst of this invention is a compound which forms a salt or a partial half salt with the nitrogen-containing organic compound. The base component of the novel blowing or foaming or rise catalyst may be present as a reaction product, i.e. a salt, with the nitrogen-containing organic compound.

The preferred bases are sodium hydroxide and potassium hydroxide. Other alkali metal and alkaline earth metal hydroxides are suitable.

b. The Antimony Compound

The antimony compound is of the formula $Sb_2O_3$, $Sb_2O_5$ or $Sb(Y)_n$ wherein Y is selected from the group consisting of $R^1$, $OOCR^1$, halogen, $OR^1$, $SR^1$, $OOCR^2SH$, $SR^2COOR^1$ and

$$-SCNR^1_2$$

wherein $R^1$ and $R^2$ are selected from the same group as R and R'', respectively, as previously defined for the gel catalyst, and $n$ is 3 or 5. The antimony compounds encompassed by the invention include both the trivalent and pentavalent forms of antimony.

The antimony compound exhibits the formulae:
$R_a^1Sb(SC-NR^3_2)_{n-a}$, $R_a^1SbX_{n-a}$, $R_a^1Sb(OOCR^3)_{n-a}$, $R_a^1Sb(OR^3)_{n-a}$,
$R_a^1Sb(SR^3)_{n-a}$, $R_a^1Sb(SR^2COOR^3)_{n-a}$, or $R_a^1Sb(OOCR^2SH)_{n-a}$
wherein $n$ represents the valence of antimony, i.e. 3 or 5, and $a$ is an integer less than 5 or zero, $R^1$ and $R^2$ are as defined above and $R^3$ is selected from the same group as R.

In the foregoing tin and antimony compounds R, $R^1$ and $R^3$ are hydrocarbon radicals individually selected from the group consisting of alkyl, alkenyl, cycloalkyl, aralkyl, aryl and alkaryl, including such radicals when inertly substituted. Alkyls can be straight chain or branched, including methyl, ethyl, n-propyl, isopropyl, n-butyl, isobutyl, sec-butyl, tert-butyl, n-amyl, neopentyl, isoamyl, n-hexyl, heptyls, octyls, decyls, dodecyls, tetradecyl and octadecyl. Preferred alkyl radicals contain between 1 and 8 carbon atoms. Typical cycloalkyl radicals include cyclopentyl, cyclohexyl, cycloheptyl and cyclooctyl. When R is aralkyl, it may typically be benzyl, β-phenylethyl or β-phenylpropyl. Typical aryls include phenyl and naphthyl. Typical alkaryls include tolyl, xylyl, p-ethylphenyl and p-nonylphenyl, R,R' and $R^3$ may be inertly substituted, e.g. may bear a nonreactive substituent such as alkyl, aryl, cycloalkyl, aralkyl, alkaryl, alkenyl, ether, halogen, nitro and ester radicals. Typical substituted alkyl radicals include 3-chloropropyl, 2-ethoxyethyl and carboethoxymethyl. Substituted alkenyls include 4-chlorobutenyl, β-phenylpropenyl and chloroallyl, among others. Substituted cycloalkyl radicals include 4-methylcyclohexyl and 4-chlorocyclohexyl. Typical inertly substituted aryl radicals include chlorophenyl, anisyl and biphenyl. Substituted aralkyl radicals include chlorobenzyl, p-phenylbenzyl, p-methylbenzyl. Substituted alkaryl radicals include 3-chloro-5-methylphenyl, and 2,6-di-tert-butyl-4-chlorophenyl.

The preferred antimony compounds in the practice of this invention are antimony carboxylates. The carboxylate radical is represented in simplest form as $R^4(COO-)_n$ wherein $R^4$ represents a hydrocarbon radical exhibiting a valence of $n$. When $n$ is 1 $R^4$ represents an aliphatic or cycloaliphatic radical such as alkyl or alkenyl, and corresponding cyclic groups such as cycloalkyl groups; an aryl radical such as phenyl, substituted phenyls and naphthyl, an aralkyl radical such as benzyl, styryl and cinnamyl; an alkaryl radical such as tolyl or xylyl. Preferably $n$ is 1 and the acid is monobasic. Alternatively $n$ may be 2 or 3. In the preferred embodiment, $R^4$ is an alkyl group containing between 1 and 20 carbon atoms. Typical of the acids from which the preferred antimony salts can be prepared are acetic, propionic, butyric, caproic, caprylic, capric, stearic, naphthenic and oleic acids. The commercially occurring mixture of acids known as tall oil fatty acids are preferred in the practice of this invention. Antimony tritallate can be prepared by refluxing a mixture of propionic anhydride and tall oil fatty acids, the latter having an acid number of 199 and distilling off propionic acid as it is formed to yield a mixed propionic-tall oil acid anhydride. Antimony trioxide is then added to the reaction mixture, which is maintained at reflux temperature for 90 minutes following the oxide addition. The pressure in the reaction vessel is then reduced to 4 millimeters of mercury and the byproduct propionic anhydride recovered by distillation. The residue remaining in the reaction vessel is passed through a bed of diatomaceous earth to obtain the product, the antimony salt of tall oil fatty acids.

The antimony carboxylate is preferably formed from an amount of acid sufficient to satisfy each of the valence bonds of the antimony metal. The salts which can be used in practice of this invention are those materials prepared by neutralizing a basic compound of the metal, typically the hydroxide or oxide.

Specific antimony compounds operable in the practice of this invention include but are not limited to the following:
antimony tritallate
antimony tri(2-ethylhexoate)
antimony tristearate
antimony trilaurate
antimony trimyristate
antimony tripalmitate
antimony trioleate
antimony triricinoleate
antimony trinaphthenate
antimony tribenzoate
antimony trisalicylate
antimony triphenoxide
antimony tri(nonylphenoxide)
antimony caproate diheptylate
antimony tricaprylate dibromide
antimony tributyrate dibromide
antimony tricinnamate dibromide
antimony trivalerate dibromide
antimony triheptylate dibromide
antimony tricaprate dibromide
tris(2,3-dichloropropyl) antimonite
tris(β-chloroethyl)antimonite
tris(β-chlorobutyl)antimonite
tris(2-chloro-2-phenylethyl)antimonite
tris(n-octoxy) antimony dibromide
tris(2-ethylhexoxy) antimony dibromide
tribenzoxy antimony dibromide
tris(β-chloroethoxy) antimony dibromide
tris(β-chlorobutoxy) antimony dibromide
phenyl antimony dibromide
tolylantimony dibromide
butylantimony diiodide
benzylantimony dichloride
cyclohexylantimony dibromide
allylantimony diiodide
chlorophenylantimony dichloride octylantimony dibromide
diphenylantimony acetate
diphenylantimony propionate
diphenylantimony butyrate
ditolylantimony α-methylpropionate
dixylylantimony α-methylpropionate
di-a-naphthylantimony acetate
ditolylantimony butyrate
bis(p-chlorophenyl) antimony γ-chlorobutyrate
diphenylantimony β-ethoxypropionate
diethylantimony acetate
di-n-propylantimony propionate
di-n-butylantimony α-methylpropionate
di-n-octylantimony propionate
dilaurylantimony butyrate
bis(2-ethylhexyl) antimony α-methylpropionate
di-n-hexylantimony acetate
diallyantimony acetate
di-2-butenylantimony propionate
dibenzylantimony α-methylpropionate
dicyclohexylantimony acetate
diphenylantimony valerate
diphenylantimony caproate
ditolylantimony α-methylvalerate
dixylylantimony β-methylvalerate
diethylantimony α-ethylcaproate
di-n-propylantimony caprylate
di-n-butylantimony caprate
di-α-naphthylantimony pelargonate
di-n-octylantimony laurate
dilaurylantimony stearate
di-2-ethylehxylantimony oleate
di-n-hexylantimony benzoate
diallylantimony p-toluate
di-2-butenylantimony p-ethylbenzoate
dibenzylantimony α-naphthoate
dicyclohexylantimony phenylacetate
diphenylantimony phenoxyacetate
diphenylantimony linoleate
ditolylantimony cyclohexanoate
diphenylantimony tetrachlorobenzoate
diphenylantimony tallate
ditolylantimony rosinate
bis(p-chlorophenyl) antimony pelargonate
diphenylantimony p-chlorobenzoate
diphenylantimony dithiocarbamate
dibutylantimony methyldithiocarbamate
diphenylantimony dimethyldithiocarbamate
ditolylantimony ethyldithiocarbamate
diallylantimony diethyldithiocarbamate
phenylantimony di(n-propyldithiocarbamate)
tolylantimony di(di-n-propyldithiocarbamate)
butylantimony di(isopropyldithiocarbamate)
allylantimony di(di-isopropyldithiocarbamate)
benzylantimony di(butyldithiocarbamate)
cyclohexylantimony di(dibutyldithiocarbamate)
chlorophenylantimony di(octyldithiocarbamate)
octylantimony di(dioctyldithiocarbamate)
dibenzylantimony dodecyldithiocarbamate
dichlorophenylantimony didodecyldithiocarbamate
dicyclohexylantimony hexadecyldithiocarbamate
dioctylantimony phenyldithiocarbamate
diphenylantimony diphenyldithiocarbamate
dicyclohexylantimony cyclohexyldithiocarbamate
phenylantimony di(dicyclohexyldithiocarbamate)
tolylantimony di(allyldithiocarbamate)

cyclohexylantimony di(diallyldithiocarbamate)
diphenylantimony benzyldithiocarbamate
dibenzylantimony dibenzyldithiocarbamate
di(diphenylantimony) methylenebisdithiocarbamate
di(ditolylantimony) ethylenebisdithiocarbamate
di(dicyclohexylantimony) propylenebisdithiocarbamate
phenylantimony trimethylenebisdithiocarbamate
tolylantimony tetramethylenebisdithiocarbamate
butylantimony hexamethylenebisdithiocarbamate
allylantimony octamethylenebisdithiocarbamate
benzylantimony o-phenylenebisdithiocarbamate
phenylantimony m-phenylenebisdithiocarbamate
di(diphenylantimony) p-phenylenebisdithiocarbamate
di(ditolylantimony) α-tolylenebisdithiocarbamate
chlorophenylantimony xylylenebisdithiocarbamate
di(diphenylantimony) 4,4'-biphenylenebisdithiocarbamate
di(diphenylantimony) 4-chloro-1,2-phenylenebisdithiocarbamate
diphenylantimony dimethylenedithiocarbamate
phenylantimony di(pentamethylenedithiocarbamate)
cyclohexylantimony di(hexamethylenedithiocarbamate)
tolylantimony N,N'-diethyl ethylenebisdithiocarbamate
butylantimony di(N-methyl ethyldithiocarbamate)
allylantimony N,N'-dimethyl hexamethylenebisdithiocarbamate
dichlorophenylantimony N-(3-chloro-2-butenyl)-cyclohexyldithiocarbamate
octylantimony di(N-cyclohexyl amyldithiocarbamate)
antimony S,S',S" tri(octadecyl thiomaleate)
antimony S,S',S" tri(dihydroabietyl mercaptoacetate)
antimony S,S',S" tri(nonylmercaptoacetate)
triphenylantimony S,S' bis(isooctylmercaptoacetate)
tri-n-octylantimony S,S' bis(isooctylmercaptoacetate)

c. The Nitrogen Containing Compound

Nitrogen-containing compounds operable in the practice of this invention include primary, secondary, and tertiary amino-substituted carboxylic acids, aromatic amino-substituted carboxylic acids, monoamino-monocarboxylic acids, monoamino-dicarboxylic acids, diamino-monocarboxylic acids, heterocyclic aminoacids, amidoximes, and hydroxamic acids.

Among the specific amino-substituted carboxylic acids operable in the practice of this invention are the following amino acids: aminoacetic acid, α-amino-β-p-hydroxyphenyl acetic acid, α-aminopropionic acid, α-aminoisovaleric acid, α-aminoisocaproic acid, α-amino-β-methylethyl propionic acid, α-amino-α-methylbutyric acid, α-amino-β-phenylpropionic acid, α-amino-β-parahydroxyphenyl propionic acid, α-amino-β-hydroxypropionic acid, α-amino-γ-hydroxybutyric acid, α-amino-delta-guanidine acid, arginine, ornithine, asparagine, citrulline, proline, hydroxyproline, and nitrilotriacetic acid.

Among the amidoximes operable in the practice of this invention are those of the formula

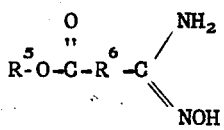

Hydroxamic acids of the formula

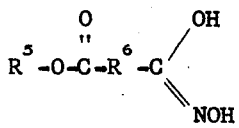

are also suitable. $R^5$ represents an alkyl cycloalkyl, aryl, alkaryl or aralkyl radical containing 3 to 18 carbon atoms and $R^6$ is an alkylene radical containing 1 to 3 carbon atoms, such that the total number of carbon atoms in the compound does not exceed 21.

Thus $R^5$ can be propyl, isopropyl, butyl, isobutyl, amyl, isoamyl, hexyl, cyclohexyl, 2-ethylhexyl, nonyl, decyl, n-decyl, dodecyl, tridecyl, oleyl, and stearyl.

Specific hydroxamic acids, operable in the practice of this invention include: acetohydroxamic acid, butyrohydroxamic acid, butylmercaptoacetohydroxamic acid, p-toluohydroamic acid, p-amylbenzohydroxamic acid, laurohydroxamic acid, salicylhydroxamic acid, palmitohydroxamic acid, stearohydroxamic acid, oleohydroxamic acid, p-tertiary amylphenoxyacetohydroxamic acid, dodecane-1-mercaptosuccinodihydroxamic acid, N-dibutylaminoacetohydroxamic acid and o-methoxybenzohydroxamic acid.

The amidoximes can be prepared by reaction of the corresponding cyanoacetic esters, cyanopropionic esters, or cyanobutyric esters with hydroxylamine. Hydroxylamine is in turn obtained by liberation from a salt, e.g. hydroxylamine hydrochloride, with alkali. Generally, 1 mole of the corresponding cyanoacetic ester is reacted for 1 to 6 hours with from 1 to 2 moles of hydroxylamine at temperatures from about 30° to 70°C. and a pH from about 7 to 9.

The hydroxamic acid of the present invention can be prepared in several ways. For instance the amidoximes previously described can be hydrolyzed with water at temperatures from −10° to +10°C. in concentrated mineral acids, thereby converting the amidoxime to corresponding hydroxamic acid. A preferred method, however, of preparing hydroxamic acid is to react a diester of maleic succinic or gluconic acid with hydroxylamine. Generally, equimolar portions of the diester and hydroxylamine are reacted for 2–6 hours at a pH from 8 to 11 and at temperatures of from 15° to 50°C., thereby forming the desired monohydroxamic acid. In the case of the maleic acid, the desired diester can be easily made by transesterification of the commercially available diethylmaleate with an alcohol containing the desired higher hydrocarbon radical.

The weight ratio of antimony compound to the salt formed by reaction of the aforementioned base with the organic nitrogen-containing compound can be varied from about 0.11 to 9. Generally, substantially equal weights of antimony carboxylate and salt of the nitrogen-containing compound synergize most efficaciously.

THE POLYISOCYANATE

The term "isocyanates" as used herein encompasses both polyisocyanates and polyisothiocyanates, including particularly diisocyanates and diisothiocyanates. While the invention has been described specifically with reference to the reaction of certain diisocyanates, it is generically applicable to the reaction of any compound containing two or more —N=C=G groups wherein G is oxygen or sulfur. Compounds within this generic definition include polyisocyanates and polyisothiocyanates of the general formula $R^7(NCG)_x$ in which $x$ is 2 or more and $R^7$ can be alkylene, substituted alkylene, arylene, substituted arylene, a hydrocarbon or substituted hydrocarbon containing one or more aryl—NCG bonds and one or more alkyl—NCG bonds, a hydrocarbon or substituted hydrocarbon containing a plurality of either aryl—NCG or alkyl—NCG bonds.

A variety of organic polyisocyanates may be used in the practice of this invention although diisocyanates are preferred in many formulations. Suitable polyfunctional isocyanates include alkylene diisocyanates such as hexamethylene diisocyanate, and decamethylene diisocyanate, the isomeric tolylene diisocyanates and naphthalene diisocyanates, 4,4'-diphenylmethane diisocyanate in addition to mixtures of two or more of the foregoing polyisocyanates. Triisocyanates typically obtained by reaction with 3 moles of an arylene diisocyanate with 1 mole of a triol, e.g. the products formed from 3 moles of tolylene diisocyanate and 1 mole of hexane triol may be employed. A preferred polyisocyanate is a mixture containing 80 percent by weight of 2,4-tolylene diisocyanate and 20 percent 2,6-tolylene diisocyanate. Other suitable polyfunctional isocyanates include hexamethylene diisocyanate, 1,8-diisocyanato-p-methane, xylylene diisocyanates ($OCNCH_2C-H_2OCH_2)_2$, 1-methyl-2,4-diisocyanato-cyclohexane, phenylene diisocyanates, the isomeric tolylene diisocyanates, chlorophenylene diisocyanates, diphenylmethane-4,4'-diisocyanate, naphthalene-1,5 diisocyanate, triphenyl-methane-4,4',4''-triisocyanate and xylene-α,α'-diisothiocyanate.

Further included are dimers and trimers of isocyanates and diisocyanates and polymeric diisocyanates of the general formulas $(R^7NCG)_x$ and $[R^7(NCG)_x]_y$ in which $x$ and $y$ are between 2 and 10, as well as compounds of the general formula $M(NCG)_x$ in which $x$ is 2 or more and M is a difunctional or polyfunctional atom or group. Examples of this type include ethylphosphonic diisocyanate, $C_2H_5P(O)(NCO)_2$, phenylphosphonic diisocyanate, $C_8H_5P(NCO)_2$, compounds containing a ≡Si—NCG group, isocyanates derived from sulfonamides ($R^7SO_2NCO$), cyanic acid, and thiocyanic acid.

THE ACTIVE HYDROGEN REAGENT

Suitable polyalkylene polyols contain two or more active hydrogen atoms as determined by the Zerewitinoff method and react with organic polyfunctional isocyanates to yield urethane polymers. These polyalkylene polyols are preferably liquids which typically exhibit an average molecular weight of about 500 to 5000 and include hydroxyl-containing polyesters, polyethers, polyisocyanate modified polyesters, amides, alkylene glycols, polymercaptans, polyamines and polyisocyanate-modified alkylene glycols. These polyalkylene polyols exhibit either primary or secondary active hydroxyl groups. The hydroxy-containing polyethers or polyesters include fatty acid glycerides.

Polyesters, a preferred type of polyalkylene polyol, can be obtained by the esterification-condensation reaction of aliphatic dibasic carboxylic acids with glycols, triols or mixtures thereof, in proportions such that most or all of the resultant polymer chains contain terminal hydroxyl groups. Dibasic carboxylic acids suitable for preparing polyesters include aliphatic and aromatic acids such as adipic, furmaric, sebasic and phthalic acids. Suitable alcohols include ethylene glycol, diethylene glycol and trimethylol propane among others. The fatty acid glycerides include those having hydroxyl numbers between about 50 and 75, such as castor oil, hydrogenated castor oil and "blown" natural oils.

Polyethers, a second preferred type of polyalkylene polyol, include polyalkylene glycols, e.g. polyethylene glycols and polypropolyne glycols, the molecular weight of these compounds is preferably between about 200 and 5000.

The method of this invention is particularly suitable for the reaction of organic polyisocyanates with high molecular weight polyols containing two or more reactive hydroxyl radicals.

Another class of polymers having terminal reactive hydroxyl groups are lactone polymers, preferably those exhibiting molecular weights within the range of 500 to 10,000.

The preparation of polyether based urethane foams can be carried out by forming a prepolymer, i.e. prereacting molar equivalents of the hydroxyl-containing polyether and isocyanate in the absence of water and thereafter producing a foam by the addition of excess isocyanate, water, foaming agent and catalyst combination of this invention. The production of urethane foams may be carried out by the "one-shot" method in which the polyol, foaming agent, catalysts and isocyanate are simultaneously mixed together and allowed to react, optionally in the presence of water. Urethane foams may also be produced by the semiprepolymer technique in which the polyether reactant is partially extended with excess isocyanate to provide a reaction product containing a high percentage of free isocyanate groups (20–35 percent), which is converted to foam at a subsequent time by reaction with the additional polyether, foaming agent and catalysts.

The foaming catalysts of this invention are used in combination with a variety of tin-containing gelation or gel catalysts which catalyze the reaction between the polyol and polyfunctional isocyanate to yield a polyurethane. Suitable tin compounds exhibit the general formula $Sn(-OCOR)_2$ or $R_2'SnX_2$ wherein $R'$ is defined as set forth in the preceding specification. The preferred stannous carboxylates are the oleate and the 2-ethylhexoate and X represents a 2-ethylhexoate, lauryl mercaptide or an isooctyl mercaptoacetate residue formed by removal of a hydrogen atom from the carboxyl or thio (—SH) radical.

Cell modifying agents, e.g. silicones such as trimethyl end-blocked dimethyl polysiloxanes may also be used in the practice of this invention.

PROPORTIONS OF REAGENTS

The polyfunctional isocyanate is typically present in an amount of 5 to 300 percent, e.g. 40 percent by weight of the polyol. Water may optionally be present in an amount sufficient to react with the isocyanate to liberate sufficient carbon dioxide which together with the methylene chloride will produce a foam of the desired physical characteristics. Approximately 1 to 10 percent water, based upon the weight of the polyol, is useful. The total foaming agent constitutes between 0.5 and 40%, based on the weight of polyol, of which methylene chloride comprises between 30 and 100%.

The amount of isocyanate used in the preparation of flexible foams should be such that there is more than the theoretical amount required to form the desired number of urethane linkage, —NCHO—O—, in the polymer. The amount of isocyanate employed generally ranges from 1 to 20 equivalents, preferably 2 to 6 equivalents, per equivalent of polyol.

Depending upon the desired density of the urethane foam and the amount of cross linking desired, the ratio isocyanate equivalents to the equivalents of active hydrogen should be 0.8 to 1.2, respectively preferably between 0.9 and 1.1.

In the practice of this invention, the combination of gel and foaming catalysts is present in the ratio of 0.01 to 5 parts by weight of the former per part of the latter. In one preferred embodiment, when the foaming catalyst combination of this invention is used with stannous 2-ethylhexoate as the gel catalyst, the ratio will be approximately 1.

Preferably the catalyst mixture will be present in a catalytic amount corresponding to 0.01 to 10 parts by weight per 100 parts of polyol. For the foaming catalyst a "catalytic amount" corresponds to between 0.005 and 5 parts by weight per 100 parts of polyol. The gel catalyst will be present in an amount corresponding to 0.005 to 4.2 parts by weight per 100 parts of polyol.

EXAMPLES

The following examples demonstrate the relatively large concentrations of methylene chloride that can be employed using the gel catalyst and foaming catalyst of this invention. In addition to the catalysts and foaming agent the formulation used to prepare the urethane foams exhibited the following composition.

| | Parts by Weight |
|---|---|
| Polyol(a polyether-polyol exhibiting an average molecular weight of 3500, a hydroxyl number of 45.8–48.8, a viscosity of 600 centipoises at 25°C. and available as Polyol 16–46 from Union Carbide Chemical Corporation) | 100 |
| An 80/20 weight ratio mixture of p- and m- tolylene diisocyanate | 37.9 |
| Water | 3.0 |
| Silicone (a non-hydrolyzable silicone-oxyalkylene block copolymer) | 2.4 |

The catalysts and foaming agents evaluated, together with the rise time, indent load deflection per 50 square inches (323 cm.$^2$) at 25% and 65% deflection and density of the resultant cellular product are summarized in Table I, wherein all parts are by weight. The indent load deflection (ILD) is evaluated using ASTM test method D-1564-64T, method B, Indentation Residual Gauge Load.

All of the components in the formulation, including foaming agent and catalysts as specified in Table I, were combined at ambient temperature under high shear produced by rapid stirring.

The polymerization and foaming reactions were observed to begin almost immediately after all ingredients had been combined. After a few seconds of stirring the formulation was poured into a cylindrical container and permitted to rise. The rise time represents the elapsed time between combining of the ingredients and attainment of maximum height by the foamed sample.

TABLE I

| Formulation No. | Prior Art 1 | Present Invention 2 | Prior Art 3 | Present Invention 4 |
|---|---|---|---|---|
| Amine[1] (prior art foaming catalyst) (parts) | 0.2 | — | 0.2 | — |
| Antimony Type Foaming catalyst[2] (parts) | — | 0.15 | — | 0.15 |
| Gel Catalyst - Stannous Octoate (parts) | 0.35 | 0.45 | 0.45 | 0.45 |
| Trichlorofluoromethane (parts) | 30.0 | — | 10.0 | 10.0 |
| Methylene Chloride (parts) | — | 30.0 | 20.0 | 20.0 |
| Rise Time (seconds) | 150 | 90 | foam develops splits | 108 |
| Density (lbs./ft.$^3$) | 1.01 | 1.03 | do. | 1.01 |
| ILD at 25% | 12 | 11 | do. | 12 |
| at 65% | 22.5 | 20 | do. | 22.5 |
| Dimensional Stability[3] (% change in volume) | 3.2 | 3.7 | do. | 2.0 |

NOTES:
[1]A bis(2-dimethylamino ethyl)ether available as Niax Catalyst A-1 from Union Carbide Chemical Corporation.
[2]A mixture of between 50 and 60% by weight of antimony tris tallate and 40–50% by weight of the potassium salt of Nopchelate OS as disclosed in Table I of U.S. Patent 3,620,985, which is hereby incorporated by reference.
Nopchelate OS(sold by Nopco Chemical Company, Newark, New Jersey) comprises nitrogen-containing organic acids having the formula $C_xH_yO_2N$ wherein x ranges from 10 to 18 and y ranges from 21 to 37 and alkali metal salts of said acids. "Nopchelate OS" exhibits a molecular weight of approximately 270, a specific gravity of 1.0 and contains 6.75% potassium (equivalent), approximately 2.1% nitrogen, 80% solids, 20% xylene, and is a solution of alkyl amido oximes in xylene. A more complete description of the compound is found in U.S. Pat. Nos. 3,088,798; 3,088,799; and 3,345,344.
[3]The dimensional stability represents the % change in dimensions of the foam sample during the dry heat aging test described in sections 38–44 of ASTM Test Procedure D1564-64T.

The data in Table I indicates that useful low density polyurethane foams comparable to those obtained using a conventional prior art foaming catalyst (an amine) and foaming agent (trichlorofluoromethane) can be obtained using the antimony-containing foaming catalyst of this invention and substituting an equal weight of methylene chloride for the trichlorofluoromethane, which may be as much as 2.5 times more costly than methylene chloride. Moreover, the rise time is reduced by 40%. When an attempt is made to incorporate more than 10 parts of methylene chloride using amines as the foaming catalyst the foam develops structural defects which destroy both the cellular structure and the utility of the product.

What is claimed is:

1. A method for preparing a cellular polyurethane which comprises reacting 100 parts by weight of a polyol having reactive hydrogens as determined by the Zerewitinoff method; 5–300 parts by weight of an organic polyfunctional isocyanate; 1–10 parts of water; between 0.5 and 40 parts of a foaming agent containing between 30 and 100% by weight of methylene chloride; 0.005–5.0 parts of a gel catalyst selected from the group consisting of stannous salts of carboxylic acids of the formula $Sn(OCOR)_2$ wherein the acid contains between 1 and 20 carbon atoms and organotin compounds of the general formula $R_2'SnX_2$ wherein R' is selected from the group consisting of alkyl and alkenyl radicals, each of which contains between 1 and 18 carbon atoms, cycloalkyl, aryl, alkaryl and aralkyl radicals, and X represents a monovalent radical selected from the group consisting of halogen atoms and radicals of the general formulae R''COO—, R''S—, R''O— and SR'''COOR'' wherein R'' is in turn selected from the same group as R' and R''' is an alkylene radical containing between 1 and 8 carbon atoms, and 0.005 to 5 parts of a foaming catalyst containing (1) 10 to 90% by weight of an antimony compound of a general formula selected from the group consisting of $Sb_2O_3$, $Sb_2O_5$ and $Sb(Y)_n$ wherein $n$ is 3 or 5 and Y is selected from the group consisting of —R$^1$, —OOCR$^1$, halogen, —OR$^1$, —SR$^1$, —OOCR$^2$SH, —SR$^2$COOR$^1$ and

wherein R$^1$ and R$^2$ are selected from the same group as R and R''', respectively, and (2) 90 to 10% by weight of a sodium or potassium salt of a nitrogen-containing organic compound selected from the group consisting of primary, secondary and tertiary amino-substituted carboxylic acids, aromatic amino-substituted carboxylic acids, monoamino-monocarboxylic acids, monoamino-dicarboxylic acids, diamino-monocarboxylic acids, heterocyclic aminoacids, amidoximes, and hydroxamic acids, said gel catalyst and foaming catalyst combination being present in the weight ratio of 0.01 parts to 5 parts of the former per part of the latter.

2. The method for preparing a cellular polyurethane as claimed in claim 1 wherein said nitrogen-containing organic compound is an amino-substituted carboxylic acid.

3. The method for preparing a cellular polyurethane as claimed in claim 1 wherein the nitrogen-containing organic compound is an amidoxime of the formula

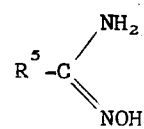

wherein R$^5$ is a monovalent hydrocarbon radical containing 3 to 18 carbon atoms.

4. The method for preparing a cellular polyurethane as claimed in claim 1 wherein said nitrogen-containing organic compound is an amidoxime of the formula

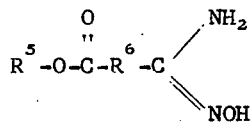

wherein R$^5$ is a monovalent hydrocarbon radical containing 3 to 18 carbon atoms and R$^6$ is a divalent hydrocarbon radical containing 1 to 3 carbon atoms, such that the total number of carbon atoms in said formula does not exceed 21.

5. The method for preparing a cellular polyurethane as claimed in claim 1 wherein said nitrogen-containing organic compound is a hydroxamic acid of the formula

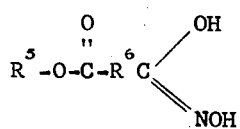
wherein R⁵ is a monovalent hydrocarbon radical containing 3 to 18 carbon atoms and R⁶ is a divalent hydrocarbon radical containing 1 to 3 carbon atoms such that the total number of carbon atoms in said formula does not exceed 21.
6. The method for preparing a cellular polyurethane as claimed in claim 1 wherein said antimony compound is antimony tritallate.
* * * * *